UNITED STATES PATENT OFFICE.

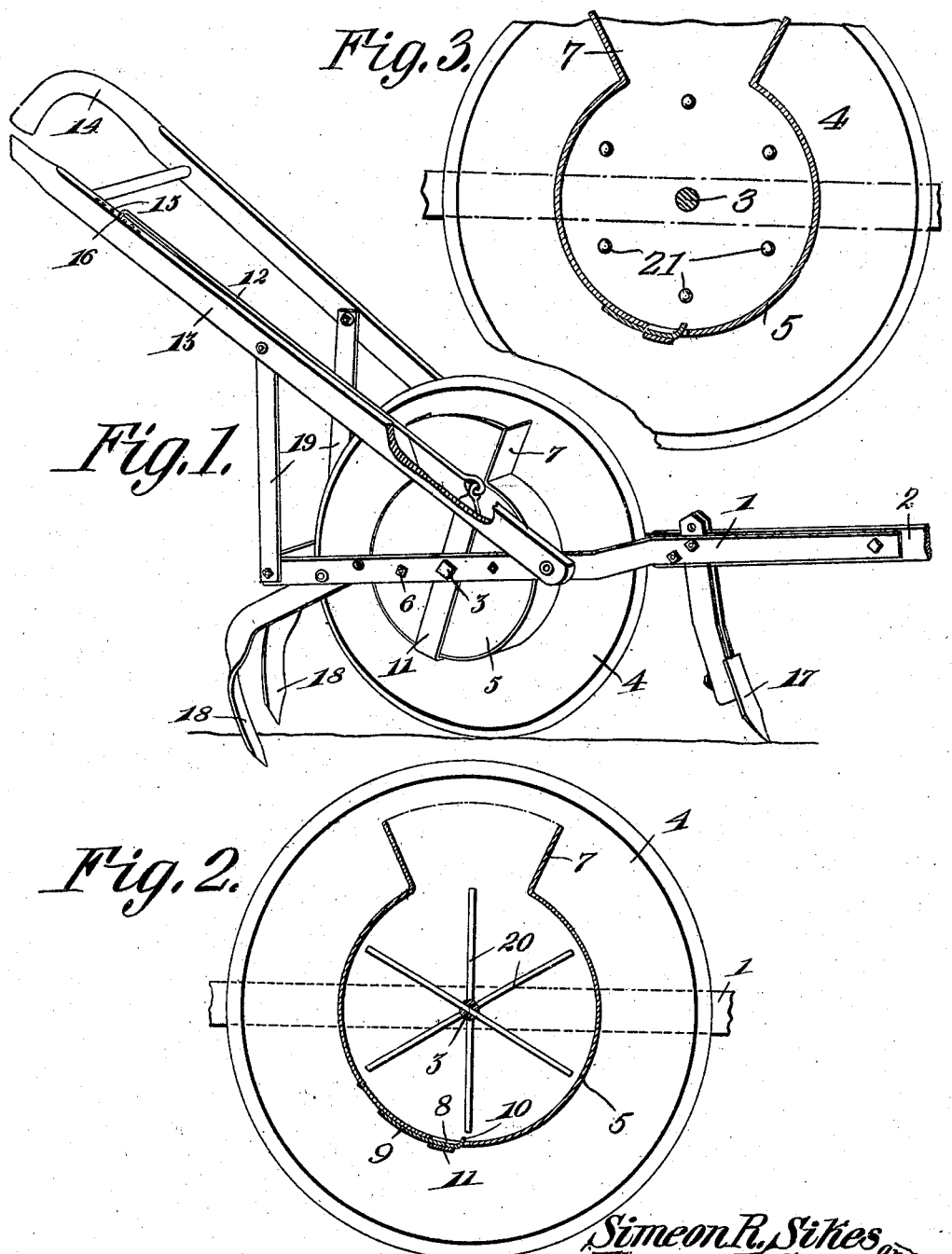

SIMEON R. SIKES AND THOMAS E. SIKES, OF OCILLA, GEORGIA.

SEED-PLANTER.

No. 848,135.  Specification of Letters Patent.  Patented March 26, 1907.

Application filed November 2, 1906. Serial No. 341,743.

*To all whom it may concern:*

Be it known that we, SIMEON R. SIKES and THOMAS E. SIKES, citizens of the United States, residing at Ocilla, in the county of Irwin and State of Georgia, have invented a new and useful Seed-Planter, of which the following is a specification.

This invention relates to seed-planters; and its object is to provide a simple and compact machine of this character which will deposit seeds at desired points, said machine having means for opening and closing the furrow before and after the seeds have been dropped.

A still further object is to provide means of novel construction for regulating the discharge of seeds.

With the above and other objects in view, the invention consists of a frame having a furrow-opening plow in rear of which is disposed a supporting-wheel. This wheel closes one side of a hopper which is carried by the frame and which has an outlet-opening normally closed by a manually-operated valve.

The invention also consists of a valve which is provided for deflecting seeds through the outlet-opening in desired quantities.

The invention also consists of certain other novel features of construction and combinations of parts, which will be hereinafter more fully described, and pointed out in the claims.

In the accompanying drawings is shown the preferred form of the invention.

In said drawings, Figure 1 is a perspective view of the machine. Fig. 2 is a section through the seed-receptacle and showing the wheel in elevation, and Fig. 3 is a detail view showing a modification.

Referring to the figures by characters of reference, 1 is a frame substantially rectangular in form and from the front of which extends a tongue 2. A shaft 3 is rotatably mounted within the sides of the frame 1, and a supporting-wheel 4, in the form of a solid disk, is secured to and rotates with the shaft and is disposed directly in rear of the tongue. A cylindrical receptacle 5 is secured to one side of the frame in any preferred manner, as by means of bolts 6, and has a hopper-like inlet 7 upon its upper portion through which seeds my be supplied to the receptacle. The inner face of receptacle 5 and hopper 7 is closed by the wheel 4, so that it becomes impossible for seeds to escape between the receptacle and wheel. An outlet-slot 8 is formed in the lower portion of the periphery of the receptacle 5 and is adapted to be closed by a longitudinally-movable slide 9, having an upturned inclined deflecting-tongue 10 at its forward end and which projects into receptacle 5. An angular arm 11 is pivoted on shaft 3, between receptacle 5 and one side of the frame, and one end of this arm is fastened to that end of slide 9 from which the tongue 10 projects while the other end of the arm has an actuating-rod 12 pivotally connected to it. This rod extends longitudinally of one of a pair of inclined strips 13, terminating in handles 14, and a series of recesses 15 is formed within said strip, and any one of these recesses is adapted to be engaged by a finger 16, formed upon the rod 12. A furrow-opening plow 17 is connected to the machine close to the rear end of tongue 2 and in front of wheel 4. Plows 18 for closing the furrow are connected to the rear corners of frame 1, the plow in rear of receptacle 5 being arranged a little ahead of the other plow 18. Braces 19 connect the rear portion of frame 1 with the strips 13, so that said strips will be held rigid upon the frame. Stirring-arms 20 radiate from shaft 3 so as to agitate the contents of the receptacle 5 and keep them in motion during the operation of the machine.

When the machine is drawn forward, the plow 17 will cut a furrow into which the wheel 4 will travel. The rotation of wheel 4 will cause the arms 20 to move the seeds downward toward the tongue 10, and by pushing longitudinally upon the rod 12 after it has been released from strip 13 arm 11 will swing upon the shaft 3 so as to move the slide 9 longitudinally and produce an outlet between the tongue 10 and one end of the slot. The seeds will be directed against the tongue by arms 20 and deflected through the outlet-opening. The quantity of seeds discharged in this manner can, of course, be regulated by increasing or diminishing the size of the outlet-opening. By placing finger 16 in one of the recesses 15 the valve can be locked in adjusted position. After the seeds have fallen upon the ground through the outlet-opening the forward plow 18 will scrape them into the furrow and the other plow 18 will then close the furrow.

As shown in Fig. 3, spikes or other devices may be inserted through or driven into the wheel 4 so as to extend laterally therefrom and into the receptacle 5 and used in lieu of the arms 20, hereinbefore described. These projecting devices have been shown at 21.

It will be seen that this machine is of very simple construction, can be easily manipulated, and it is very efficient and durable. There are no complicated parts to get out of order, and the discharge of seeds is at all times under the direct control of the operator.

What is claimed is—

1. A planter comprising a movable frame, a seed-receptacle carried thereby and having an outlet-opening in the bottom portion thereof, a manually-operated slide normally closing said opening, a deflecting-tongue extending from the slide, and means within the receptacle for directing the seeds against the tongue.

2. In a planter the combination with a seed-receptacle having an elongated outlet-opening in its bottom portion; of a slide normally closing said opening, a deflecting-tongue upon the slide, and rotatable means within the receptacle for directing material against the tongues.

3. In a planter the combination with a seed-receptacle having an elongated outlet-opening in its bottom portion; of a slide normally closing said opening, a deflecting-tongue upon the slide, an oscillating arm connected to and adapted to operate the slide to open or close the opening, means for actuating the arm, and a locking device for said means.

4. In a planter the combination with a seed-receptacle having an elongated outlet-opening in its bottom portion; of a slide normally closing said opening, a deflecting-tongue upon the slide, an oscillating arm connected to and adapted to operate the slide to open or close the opening, means for actuating the arm, a locking device for said means, and rotatable means within the receptacle for directing material against the deflecting-tongue.

5. In a planter the combination with a seed-receptacle having an outlet-opening therein; of a slide normally closing said opening, a deflector movable with the slide for directing material through the outlet when open, and rotatable means for directing material against the deflector.

6. In a planter the combination with a receptacle having an inlet and an outlet, and a wheel supporting the receptacle and constituting one wall thereof; of means rotatable within the receptacle and with the wheel for directing material from the inlet toward the outlet.

In testimony that we claim the foregoing as our own we have hereto affixed our signatures in the presence of two witnesses.

SIMEON R. SIKES.
THOMAS E. SIKES.

Witnesses:
S. E. COLEMAN,
C. M. SMITH.